Aug. 9, 1966      W. P. REID ETAL      3,265,412

SEALED PIPE COUPLING ASSEMBLY

Filed July 10, 1964

INVENTORS.
WILLIAM P. REID
HAROLD A. PRICE
BY
Paul A. Weilein
ATTORNEY

United States Patent Office 3,265,412
Patented August 9, 1966

3,265,412
SEALED PIPE COUPLING ASSEMBLY
William P. Reid, 2610 E. 67th St., Long Beach, Calif., and Harold A. Price, Orange, Calif.; said Price assignor to said Reid
Filed July 10, 1964, Ser. No. 381,805
2 Claims. (Cl. 285—323)

This invention relates to a sealed pipe coupling assembly that is particularly suited for joining plastic pipes but may also be used for joining pipes made of other materials.

In coupling pipes that are out-of-round or elliptical as is more often the case with plastic pipes, a reliable seal will not be provided or maintained unless the opposed surfaces with which the sealing members such as rings are engaged are circumferentially uniformly radially spaced one from the other.

It is an object of this invention to provide a novel and efficient sealed pipe coupling that will form between a coupling sleeve and pipes to be coupled, sealing ring chambers of uniform cross-section circumferentially of the pipes and having parallel seating surfaces therein for the sealing rings so that reliable seals will be provided and maintained regardless of the pipes being out-of-round or elliptical or the coupling being subjected to forces caused by movement of the pipes relative to one another or to the coupling sleeve.

It is another object of this invention to provide a novel sealed pipe joint assembly which may also be used to advantage to form a reliable seal for two pipes in a simple joint wherein one pipe telescopes the other.

An additional object of this invention is to provide a sealing assembly wherein a novel form of gland is co-operable with a particular formation in the female element of the joint whether this element be a coupling sleeve or the external component of some other particular joint, to form a sealing ring receiving chamber of uniform cross-section circumferentially, having uniformly radially opposed surfaces that are so maintained for contact with a sealing ring.

It is another object of this invention to provide a pipe coupling assembly such as described which readily and easily may be assembled by hand without use of tools.

This invention may be carried out so as to achieve the objectives herein noted by providing counterbores in the ends of a coupling sleeve, with each counterbore forming at the inner end thereof a radially disposed shoulder, a cylindrical surface extending axially from the shoulder, and an inclined surface which diverges from the cylindrical surface to an end of the sleeve. Glands are mounted on the pipes so as to extend into the counterbores. Each gland is provided with an axially split wedge portion, an enlarged end portion, and a radially disposed shoulder between such portions. The shoulders on the glands are adapted to engage the ends of the sleeve to limit extension of the glands into the counterbores. When the wedge portions of the glands are forced against the inclined surfaces in the counterbores as by suitable means such as flanged nuts screwed onto the sleeve of the flanges abutting the glands, there will be produced a wedging action between pipes and sleeve if either pipe or the sleeve is out-of-round. This wedging action will cause the pipes and sleeve if either is out-of-round to be deformed in a manner providing between the surfaces of the pipes opposing the cylindrical surfaces of the counterbores, sealing ring receiving chambers that are circumferentially of uniform cross-section having the radially opposed surfaces thereof uniformly spaced from one another as reliable seating surfaces for the sealing rings.

Other objects and advantages of the invention will be hereinafter described or will become apparent to those skilled in the art, and the novel features of the invention will be defined in the appended claims.

In the accompanying drawing.

Like reference characters in the several views of the drawing and in the following description designate corresponding parts.

Figure 1:
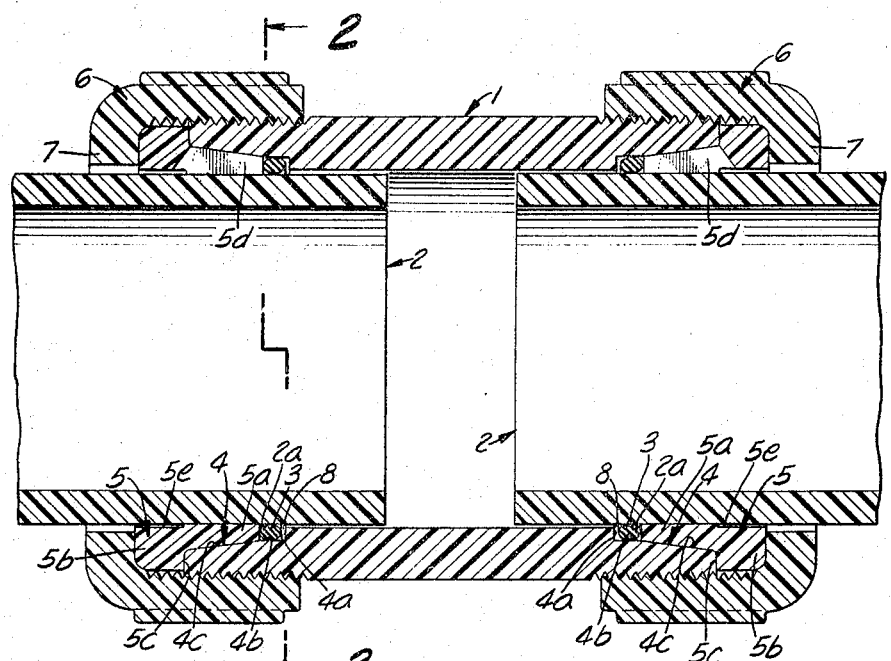
FIG. 1 is a longitudinal sectional view of a pipe coupling assembly of the present invention.

A sealed pipe coupling assembly embodying the present invention as shown in the accompanying drawing includes a coupling sleeve 1 into which are extended the ends of the pipes 2 to be coupled.

Sealing rings 3 are operable to form seals between the pipes 2 and the sleeve 1 with the aid of specially formed counterbores 4 in the ends of the sleeve, glands 5 of special form mounted on the pipes 2 for extension into the counterbores, and means, for example flanged nuts 6, the flanges 7 of which are operable for forcing the glands into the counterbores and holding them in place.

Figure 2:
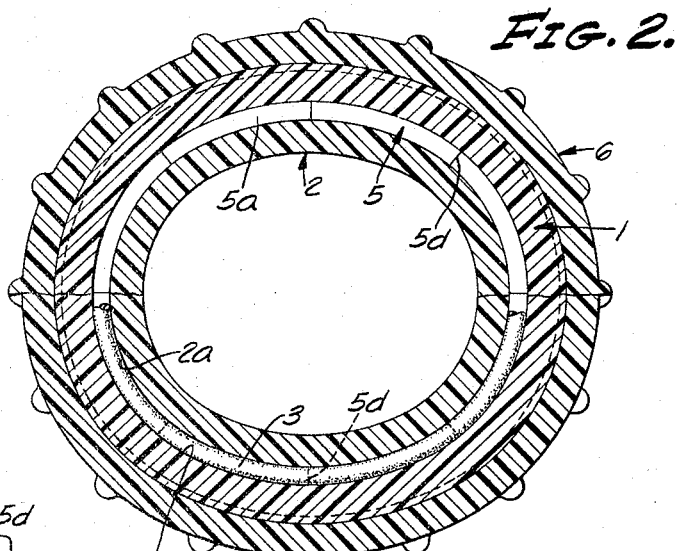
FIG. 2 is a fragmentary sectional view on the line 2—2 of FIG. 1 showing the elements of the coupling as having out-of-round or elliptical configuration (exaggerated) and as providing therebetween sealing ring receiving chambers of uniform cross-section.
Figure 3:
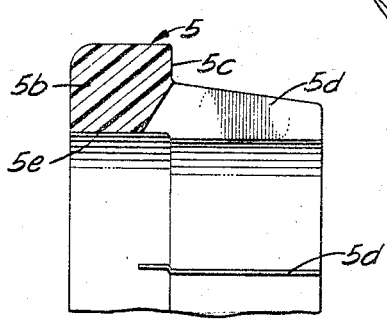
FIG. 3 is an enlarged fragmentary sectional view of a gland forming a part of the coupling assembly of this invention.

The sleeve 1, glands 5, and nuts 6 may be made of a suitable plastic material for joining pipes made of plastic material. However, it is to be understood that these elements could be made of material other than plastic and that a coupling joint formation in accordance with this invention may be embodied in sleeves and pipes made of material other than plastic. However, in accordance with the objectives of the invention, it is contemplated that the glands 5, the nuts 6, and the end of the sleeve 1 will either conform to the peripheral shape of the pipe ends, as indicated in FIG. 2, or will cause the latter to conform to the former.

Each counterbore 4 is formed to provide at the inner end thereof a radial shoulder 4a, a cylindrical seating surface 4b and a tapered or frusto-conical surface 4c which diverges to the adjacent end of the sleeve 1.

Each gland 5 is provided with a wedge-shaped flexible portion 5a and an enlarged circumferentially continuous end portion 5b providing a shoulder 5c at the juncture thereof with the wedge-shaped portion. The shoulders 5c are disposed to abut the ends of the sleeve 1 to limit extension of the glands into the counterbores 4 of the sleeve 1 to positions spacing the inner ends of wedge shaped portions 5 of the glands from the shoulders 4a in the counterbores when the nuts 6 are tightened on the sleeve 1. This spacing of the glands 5 from the shoulder 4a forms between the cylindrical surfaces 4b in the counterbores 4 and the surfaces 2a of the pipes that are radially opposite the surfaces 4b, chambers 8 that will be circumferentially of uniform cross-section with the surfaces 2a and 4b uniformly radially spaced as reliable seats for the sealing rings 3, provided the pipes and sleeves are not out-of-round. If, however, the sleeve 1 is out-of-round or that there is also this condition in either or both pipes, the wedge portions 5a of the glands upon being forced into the counterbores 4 will cause a deformation of the sleeve and pipes or either, as the case may be, to dispose the opposed surfaces 4b and 2a so that they will be uniformly radially spaced throughout and so maintained. In this connection, it should be noted that the counterbores 4 are formed accurately so that even if the sleeve is out-of-round, the surfaces 4b will be truly cylindrical.

The wedge-shaped portions 5a of each gland may be rendered flexible by means of a series of slits 5d extending axially thereof without passing entirely through the enlarged end portion 5b. In this connection, it should be noted that the enlarged end portion 5b of each gland 5 has an enlarged bore 5e which extends partly into the wedge portion 5a. This enlarged bore spaces a portion of the wedge portion 5a and the end portion 5b from contact with the pipe on which the gland is mounted so as not to interfere with flexure of the wedge portion 5a. Flexure of the wedge portion 5a is also enhanced by having the slits 5d extend past the shoulder 5c into a portion of the enlarged end portion 5b and into the enlarged bore 5e.

In assembling the pipe coupling, the pipes 2 with the sealing rings 3 and glands 5 thereon, are extended into the bore of the sleeve 1 so that the rings 3 are disposed in the chambers 8 between the shoulders 4a in the counterbores 4 and the inner ends of the glands 5. Upon now tightening the nuts 6 so that the flanges 7 thereof will engage and force the glands inwardly, should either or both of the pipes 2 in the sleeve 1 be out-of-round, the wedge portions 5a of the glands will effect a wedging action in the counterbores so as to exert a force causing deformation of the sleeve 1 or either or both pipes if out-of-round. As a result of this deformation, the seating surfaces 4a and 2a in the chambers 8 will be disposed in uniformly radially spaced relation to assure that the sealing rings 3 will seat thereon in a manner providing reliable seals.

It should be noted that the coupling of this invention provides and maintains reliable seals at all times regardless of relative movement of the pipes or movement of the pipes relative to the sleeve, as the pipes are unrestrained in the coupling as to limited axial movement relative to one another and the sleeve such as may be desired to facilitate assembly of the coupling.

While specific structural details have been shown and described, it should be understood that changes and alterations may be resorted to without departing from the spirit of the invention as defined in the appended claims.

We claim:

1. In a sealed coupling; a male element; a female element; said female element having a counterbore forming a shoulder, a cylindrical surface, and a tapering surface; a gland on said male element having a wedge portion, an enlarged end portion, and a shoulder; said wedge portion having axial slits therein, extending axially the full length thereof, said wedge portion being extensible into said counterbore; said shoulder on said gland being engageable with an end of said female member to limit insertion of said gland into said counterbore to a position axially spaced from said counterbore shoulder to form a chamber wherein said cylindrical surface and a portion of said male element opposite said cylindrical surface provide radially opposed seating surfaces; a sealing ring seated on said seating surfaces within said chamber; and means for wedging said wedge portion against said tapering surface to effect a deformation at the joint such as will dispose said seating surfaces parallel with and uniformly spaced from one another throughout their circumference in the event either of said elements is out-of-round, said enlarged end portion of said gland having a bore of greater diameter than the bore of said wedge portion so that said enlarged end portion is radially spaced from said male element.

2. The sealed coupling as set forth in claim 1, wherein said slits in said wedge portion extend past said shoulder on the gland and into said enlarged end portion.

References Cited by the Examiner

UNITED STATES PATENTS

| | | | |
|---|---|---|---|
| 2,396,163 | 3/1946 | Dies | 285—342 |
| 2,457,648 | 12/1948 | Donner | 285—323 |
| 2,515,899 | 7/1950 | Sanger-Stevens | 285—322 X |
| 2,676,037 | 4/1954 | Mueller | 285—341 X |
| 3,051,514 | 8/1962 | Consolloy | 285—323 X |

FOREIGN PATENTS

| | | |
|---|---|---|
| 379,413 | 9/1932 | Great Britain. |
| 882,115 | 11/1961 | Great Britain. |

CARL W. TOMLIN, *Primary Examiner.*

EDWARD C. ALLEN, *Examiner.*

T. A. LISLE, *Assistant Examiner.*